US012387426B2

(12) United States Patent
Mitani et al.

(10) Patent No.: US 12,387,426 B2
(45) Date of Patent: Aug. 12, 2025

(54) THREE-DIMENSIONAL GRID-BASED DATA PROCESSING DEVICE AND THREE-DIMENSIONAL GRID-BASED DATA PROCESSING METHOD

(71) Applicant: Hitachi, Ltd., Tokyo (JP)

(72) Inventors: Keiichi Mitani, Tokyo (JP); Kazuyuki Tajima, Tokyo (JP); Yusuke Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 18/138,903

(22) Filed: Apr. 25, 2023

(65) Prior Publication Data
US 2023/0377254 A1 Nov. 23, 2023

(30) Foreign Application Priority Data
May 19, 2022 (JP) ................. 2022-082510

(51) Int. Cl.
| | |
|---|---|
| *G06T 17/00* | (2006.01) |
| *G06T 7/11* | (2017.01) |
| *G06T 7/20* | (2017.01) |
| *G06T 7/70* | (2017.01) |
| *G06T 11/20* | (2006.01) |
| *G06V 10/25* | (2022.01) |
| *G06V 10/74* | (2022.01) |

(52) U.S. Cl.
CPC ............ *G06T 17/00* (2013.01); *G06T 7/11* (2017.01); *G06T 7/20* (2013.01); *G06T 7/70* (2017.01); *G06T 11/20* (2013.01); *G06V 10/25* (2022.01); *G06V 10/761* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 9,830,736 B2 * | 11/2017 | Sinha | G06T 7/20 |
| 2017/0127081 A1 * | 5/2017 | Yoshikawa | H04N 19/167 |
| 2020/0351525 A1 * | 11/2020 | Sugimoto | G06T 19/00 |
| 2021/0110606 A1 * | 4/2021 | González Aguirre | G06V 40/107 |
| 2024/0135592 A1 * | 4/2024 | Xu | G06T 9/004 |

FOREIGN PATENT DOCUMENTS

| | | |
|---|---|---|
| JP | 2008-079238 A | 4/2008 |
| JP | 2018-033107 A | 3/2018 |

* cited by examiner

*Primary Examiner* — Jeffrey J Chow
(74) *Attorney, Agent, or Firm* — Miles & Stockbridge, P.C.

(57) ABSTRACT

A three-dimensional data processing device according to the present invention detects each of a first area at a first time and a second area at a second time as an area including a subject in three-dimensional data, and calculates a difference of the three-dimensional data between the first time and the second time using coordinate transformation between the first area and the second area.

12 Claims, 12 Drawing Sheets

THREE-DIMENSIONAL GRID-BASED DATA PROCESSING DEVICE AND THREE-DIMENSIONAL GRID-BASED DATA PROCESSING METHOD

BACKGROUND OF THE INVENTION

1. Field of the Invention

The present invention relates to a technique of processing three-dimensional data that describes a subject present in a three-dimensional space.

2. Description of Related Art

Various techniques of measuring a subject present in a three-dimensional space are present. JP2018-033107A describes an object of "implementing data volume compression when a space or a subject positioned in the space can be seen from different directions during distribution of a moving image", and describes a technique, "A distribution device 220 recognizes one subject or each of a plurality of subjects in a 3D space to be distributed as a 3D object based on one or a plurality of image data received from an imaging camera 210 that images the 3D space or one subject or a plurality of subjects positioned in the 3D space, and transmits the one 3D object or the plurality of 3D objects to a user terminal 230. Next, a 3D object that is moving is detected to generate motion data representing a difference thereof. The distribution device 220 transmits the generated motion data to the user terminal 230. In the user terminal 230, the stored 3D object data is moved based on the received motion data, and not only the moving 3D object but also other 3D objects or 2D objects that are not moving in a period of time corresponding to the motion data are displayed on a display screen as an image along the line of sight." (refer to ABSTRACT).

JP2008-079238A describes an object that is "providing a technique of switching between intra-frame compression and inter-frame prediction differential compression for each of image areas", and describes a technique "An image compression device according to the present invention includes a motion vector detecting section, a determination section, an intra-frame compression section, and an inter-frame compression section. The motion vector detecting section obtains a motion vector between sets of image data for a plurality of positions on an image. The determination section determines whether a spatial variation of the motion vector on the image is large or small. The intra-frame compression section selects an image area A, which is determined to have a large spatial variation of the motion vector, from image data to be compressed, and subjects the selected image area A to the intra-frame compression. The inter-frame compression section selects an image area B, which is determined to have a small spatial variation of the motion vector, from the image data to be compressed, and subjects the selected image area B to the inter-frame prediction differential compression." (refer to ABSTRACT).

In the method described in JP2018-033107A or JP2008-079238A, data is compressed based on the motion or the motion vector between the sets of image data. However, when three-dimensional data is handled, the data volume thereof is large, and the communication band is narrowed during data transmission. Therefore, a further reduction in data volume is required.

SUMMARY OF THE INVENTION

The present invention has been made in consideration of the above-described problems, and an object thereof is to provide a technique capable of improving a compression ratio of three-dimensional data to reduce the data volume when the three-dimensional data is recorded and transmitted.

A three-dimensional data processing device according to the present invention detects each of a first area at a first time and a second area at a second time as an area including a subject in three-dimensional data, and calculates a difference of the three-dimensional data between the first time and the second time using coordinate transformation between the first area and the second area.

With the three-dimensional data processing device according to the present invention, a compression ratio of three-dimensional data can be improved to reduce the data volume when the three-dimensional data is recorded and transmitted. Objects, configurations, and effects other than those described above will be clarified by describing the following embodiments.

DESCRIPTION OF EMBODIMENTS

Figure 1:
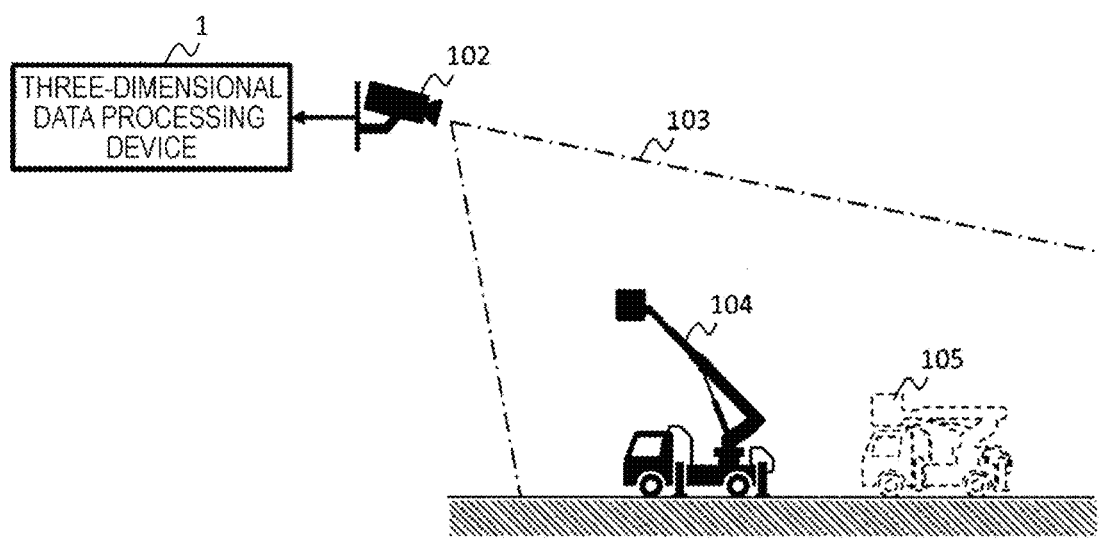
FIG. 1 is a diagram illustrating an installation environment of a three-dimensional data processing device according to a first embodiment.

Hereinafter, embodiments of the present invention will be described with reference to the drawings. In all the diagrams for describing each of the embodiments, basically, the same members are represented by the same reference numerals, and the description thereof will not be repeated. In the following embodiments, it is obvious that the components (including element steps and the like) are not necessarily required, unless expressly stated otherwise and unless they are considered to be clearly required in principle or other reasons. When referring to "including A", "composed of A", and "having A", it is obvious that the elements other than the specified one should not be excluded, unless expressly stated the fact that there is only the particular element, or other reasons. In the following embodiments, when referring to the shape, the positional relationship, or other characteristics of the components and the like, elements that substantially approximate or similar to the shape or other characteristics are included unless expressly stated otherwise and unless they are clearly considered not to be so in principle.

In the present specification and the like, the expression "first", "second", "third", or the like is added to distinguish between components, and does not always limit the number, order, or content thereof. A number for distinguishing between components is used in each context, and a number used in one context does not always the same component in another context. A component distinguished by one number may also function as a function of a component distinguished by another number.

For easy understanding of the present invention, the position, size, shape, range, and the like of each of the components illustrated in the drawings do not necessarily represent the actual ones. Therefore, the present invention is not necessarily limited to the position, size, shape, range, and the like illustrated in the drawings.

First Embodiment

FIG. 1 is a diagram illustrating an installation environment of a three-dimensional data processing device 1 according to a first embodiment of the present invention. The three-dimensional data processing device 1 generates and compresses three-dimensional information using information acquired from a distance measuring device 102. The distance measuring device 102 has a field of view 103, acquires image information including subjects 104 and 105 in the field of view 103, and outputs the image information and a camera parameter to the three-dimensional data processing device 1. The subject 104 is an object that is imaged by the distance measuring device 102 at a current time. The subject 105 is an object that is imaged by the distance measuring device 102 at a past time earlier than the current time.

The image information acquired by the distance measuring device 102 is a distance image having distance information in each of pixels, but the distance measuring device 102 may acquire not only the distance image but also a RGB image having general gradation information (for example, RGB) in each of pixels. The kind or disposition of sensors, a circuit configuration, and the like in the distance measuring device 102 are not particularly limited as long as the distance measuring device 102 can measure the distance. Examples of the distance measuring device 102 include a stereo camera where two complementary metal oxide semiconductor (CMOS) image sensors are provided, a time-of-flight (ToF) sensor where an infrared laser and an image sensor are combined, a structured light sensor where a projection pattern light emitting element and an image sensor are combined, and a device where one of the above-described devices and a RGB camera are combined and a relationship between pixel positions thereof is adjusted. The distance measuring device 102 may measure the distance using only the RGB image. For example, a correspondence between the RGB image and the distance image is learned in advance by machine learning or a relationship between the RGB image and a light field is learned using differentiable rendering or the like such that only the RGB image is input during actual use.

In the embodiment, a subject that is moving in a real space is imaged by the distance measuring device 102, and three-dimensional data is compressed based on a relative relationship between the subjects 104 and 105 imaged at the past time and the current time. In FIG. 1, only one kind of the subject is present. However, a process described below includes a case where one subject or a plurality of subjects are imaged.

Figure 2:
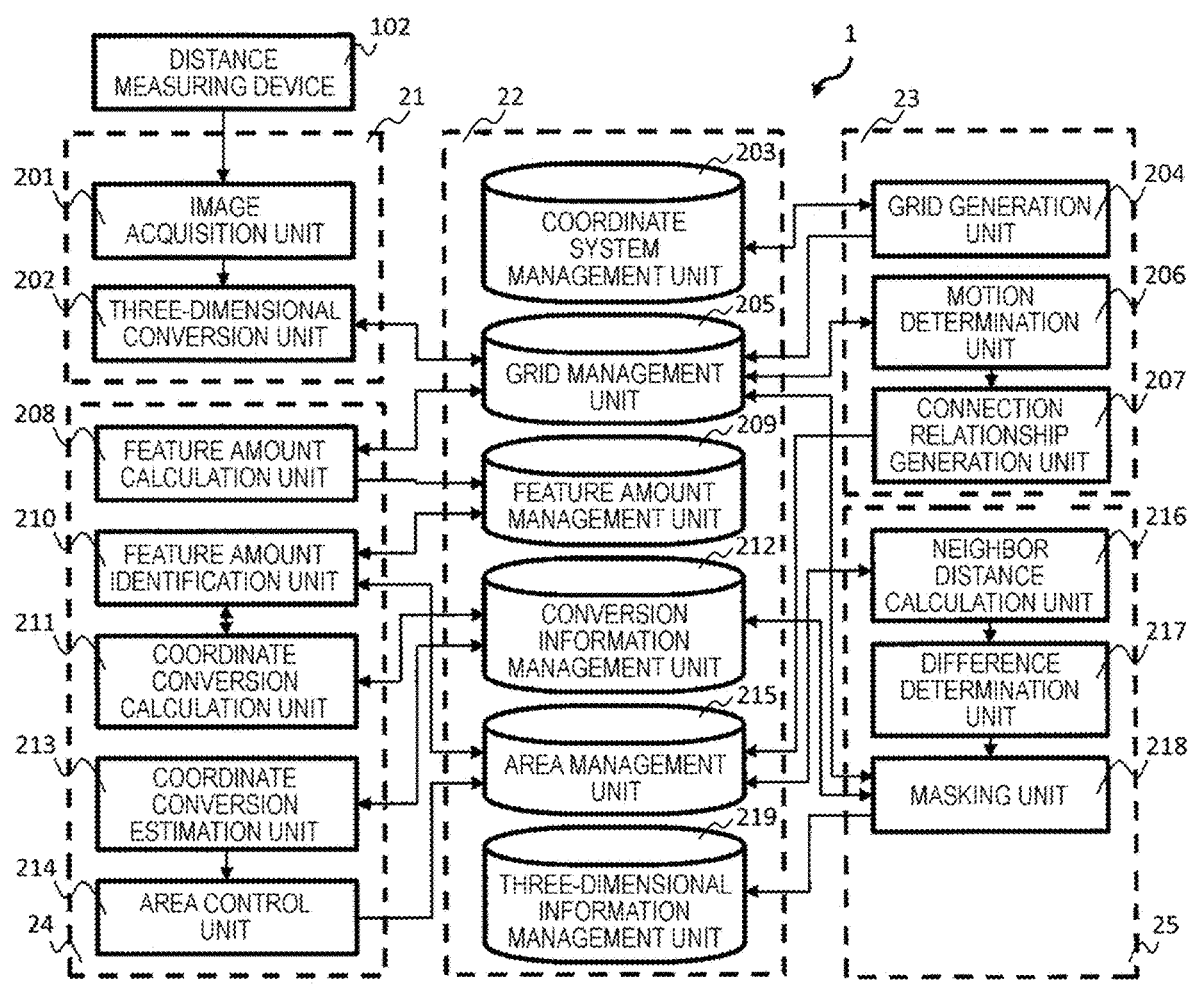
FIG. 2 is a functional block diagram illustrating the three-dimensional data processing device.

FIG. 2 is a functional block diagram illustrating the three-dimensional data processing device 1. The three-dimensional data processing device 1 includes an information acquisition unit 21 (data acquisition unit), an information management unit 22, an area information calculation unit 23 (area calculation unit), a transformation information calculation unit 24 (transformation calculation unit), and a difference information calculation unit 25 (difference calculation unit). The information acquisition unit 21 includes an image acquisition unit 201 and three-dimensional transformation unit 202. The information management unit 22 includes a coordinate system management unit 203, a grid management unit 205, a feature management unit 209, a transformation information management unit 212, an area management unit 215, and a three-dimensional information management unit 219. The area information calculation unit 23 includes a grid generation unit 204, a motion determination unit 206, and a connection relationship generation unit 207. The transformation information calculation unit 24 includes a feature calculation unit 208, a feature identification unit 210, a coordinate transformation calculation unit 211, a coordinate transformation estimation unit 213, and an area control unit 214. The difference information calculation unit 25 includes a neighbor distance calculation unit 216, a difference determination unit 217, and a masking unit 218.

The image acquisition unit 201 acquires the image information and the camera parameter from the distance measuring device 102 and outputs the image information and the camera parameter to the three-dimensional transformation unit 202.

The three-dimensional transformation unit 202 converts the image information into a cloud of three-dimensional coordinate points (hereinafter, referred to as "point cloud data") by coordinate transformation using the image information and the camera parameter acquired from the image acquisition unit 201, and outputs the point cloud data to the grid management unit 205. Even when the image information is converted into surface data generated by space interpolation of three or more coordinate points using a surface or volume data generated by space interpolation of four or more coordinate points using a polyhedron irrespective of the point cloud data, the device can be executed by referring to vertex coordinates. In the following description, the point cloud data is used.

The coordinate system management unit 203 manages information regarding a world coordinate system that is a reference when the point cloud data is handled in the three-dimensional data processing device 1, and outputs the information regarding the world coordinate system to the grid generation unit 204 in response to a request from the grid generation unit 204. The information to be managed is, for example, whether the coordinate system is a right-handed system or a left-handed system, definition of a vertical axis with respect to the ground, for example, Z-up or Y-up, or definition of vertex information or the like of a bounding box representing an effective range of data. The information to be managed may be, for example, definition in which world coordinates and a tilt angle of the distance measuring device 102 in the world coordinate system are set as the origin of the point cloud data based on information such as a position or a posture of the distance measuring device 102 that is actually installed.

The grid generation unit 204 generates grids by dividing the space in a grid shape with reference to the information regarding the world coordinate system defined by the coordinate system management unit 203, and outputs the generated grids to the grid management unit 205. The generation of the grids may be executed once at the start of the process by equally dividing the space using a rectangular parallelepiped having a width of a given size, or may be executed as necessary using a search tree such as Octree by dividing an area where the point cloud data is present into small grids and dividing a space where nothing is present into large grids.

The grid management unit 205 acquires the point cloud data from the three-dimensional transformation unit 202, acquires grid information from the grid generation unit 204, associates index information representing addresses of the grids with the point cloud data in each of the grids, calculates the density of the point cloud data in each of the grids or a representative point position of the point cloud data in each of the grids, and outputs the index information and the density information and the representative point position of the point cloud data to the motion determination unit 206. As the representative point position, for example, the centroid of the point cloud data in each of the grids is calculated. The index of a grid that is determined as a moving body by the motion determination unit 206 and the index of a grid that does not change for a given period of time are acquired, the number of frames where the grid that does not change for the given period of time is continuously in the no-change state is counted, and when the number of frames exceeds a given number, the grid is associated as the background. The index and the representative point of the grid that is determined as a moving body and the point cloud data in the grid are output to the feature calculation unit 208. The point cloud data corresponding to the index information requested from the masking unit 218 is output to the masking unit 218. Hereinafter, the grid that is determined as a moving body will be referred to as "moving grid", the grid that does not change for a given period of time will be referred to as "semi-background grid", and a grid that is registered as the background will be referred to as "background grid".

The motion determination unit 206 acquires the index information, the density information, and the representative point position of the point cloud from the grid management unit 205, determines whether each of the grids is a moving body, and when the grid is not a moving body, the grid is determined as the semi-background grid. The index information of the moving grid and the index information of the semi-background grid are output to the grid management unit 205, and the index information and the representative point position of the moving grid are output to the connection relationship generation unit 207. The determination on whether the grid is a moving body is executed, for example, depending on whether a change in density in the background grid exceeds a given threshold for a given period of time or longer. The determination on whether the grid is a semi-background is executed, for example, depending on whether a change in density in the moving grid does not change for a given period of time or longer.

The connection relationship generation unit 207 acquires the index information and the representative point position of the moving grid from the motion determination unit 206, groups the moving grids adjacent to each other as the same area, uniformly assigns an index of the group (hereinafter, referred to as "cluster identification index") to each of the moving grid groups (hereinafter, referred to as "clusters"), and outputs the index information, the representative point position, and the cluster identification index of the moving grid to the area management unit 215.

The feature calculation unit 208 acquires the index and the representative point of the moving grid and the point cloud data in the grid from the grid management unit 205, associates the calculated feature with the index of the moving grid, and outputs the associated data to the feature management unit 209. For the calculation of the feature, for example, for the point cloud in a voxel centering on the representative point, signature of histograms of orientations (SHOT) or fast point feature histograms (FPFH) is calculated.

The feature management unit 209 acquires the index of the moving grid associated with the feature from the feature calculation unit 208, and manages the acquired index for a given period of time. The index of the moving grid associated with the feature in a period of time requested from the feature identification unit 210 is output to the feature identification unit 210. The period of time to be managed may be two times including the information acquired at the current time and the information acquired at the past time or may be a period of time corresponding to several past times including the current time.

The feature identification unit 210 requests and acquires the index information of the moving grid associated with the feature in the given period of time including the current time that is stored in the feature management unit 209, requests and acquires the representative point position and the cluster identification index of the moving grid from the area management unit 215, identifies the feature in each of the clusters at the current time and the feature in each of the clusters at the past time, and outputs the index information and the representative point position of the moving grid in each of the clusters and a relationship between corresponding points from the past time to the current time to the coordinate transformation calculation unit 211. The coordinate transformation calculated for each of the clusters is acquired from the coordinate transformation calculation unit 211, and the coordinate transformation is executed on each of the representative point positions at the past time. When the sum of distances between the corresponding points of the respective representative point positions at the current time and the coordinate-converted past time is less than a given threshold or when the number of repetitions of calculation is a given number or more, a signal of identification completion is output to the coordinate transformation calculation unit 211, and each of the cluster identification indices at the identified current time is output to the area management unit 215. As an identification method, for example, a nearest neighbor search library such as fast library for approximate nearest neighbors (FLANN) or a fitting method such as random sample consensus (RANSAC) or iterative closest point (ICP) is used. When a plurality of clusters with shapes having similar features are present, erroneous association between clusters that are not spatially close to each other may occur. Therefore, here, by implementing cost minimization using a Hungarian method where the distances of between the representative point positions are used as costs, clusters adjacent to each other can be associated with each other, and erroneous association can be prevented.

The coordinate transformation calculation unit 211 acquires the index information and the representative point position of the moving grid in each of the clusters and the relationship between the corresponding points from the past time to the current time from the feature identification unit 210, and calculates the coordinate transformation between the respective corresponding points. When the signal of the identification completion is acquired from the feature identification unit 210, the current coordinate transformation is output to the transformation information management unit 212. For example, in the case of rigid transformation, the coordinate transformation can be calculated from Expression 1, where X represents a set of the representative point positions at the past time, Y represents a set of the representative point positions at the current time, R represents a rotation matrix, and t represents a translation vector. The initial values of R and t may be a unit matrix and a zero vector, respectively, or may be existing coordinate transformations managed by the transformation information management unit 212.

$$\operatorname*{argmin}_{R \in \mathbb{R}^{3\times 3}, \vec{t} \in \mathbb{R}^3} \int_{\vec{x} \in X} d\vec{x} \frac{1}{2} \|R\vec{x} + \vec{t} - f(\vec{x})\|^2 \text{ where} \quad \text{[Expression 1]}$$

$$f(\vec{x}) = \operatorname*{argmin}_{\vec{y} \in Y} \|\vec{y} - R\vec{x} - \vec{t}\|$$

The transformation information management unit 212 acquires the coordinate transformation for each of the clusters from the coordinate transformation calculation unit 211 and the coordinate transformation estimation unit 213, calculates a state space based on the coordinate transformations corresponding to several times managed, and manages the coordinate transformation and the state space for a given period of time. The state space of each of the clusters is output to the coordinate transformation estimation unit 213 in response to a request from the coordinate transformation estimation unit 213. The coordinate transformation of each of the clusters is output to the coordinate transformation calculation unit 211 and the masking unit 218 in response to a request from the coordinate transformation calculation unit 211 and the masking unit 218. The period of time to be managed is a future period of time corresponding to several past times including the current time and corresponding to several times that are estimated by the coordinate transformation estimation unit. When newly calculated coordinate transformation is acquired over time, the coordinate transformation that is an estimated value is updated, and the state space is updated correspondingly. Such information can also be managed by a graph structure where a change in moving coordinate points and posture from the start time is set as a node and a relative coordinate transformation between nodes is set as an edge such that a restriction condition regarding a measurement environment or loop closure can be imparted.

The coordinate transformation estimation unit 213 acquires the state space for each of the clusters from the transformation information management unit 212, estimates coordinate transformations at several future times, outputs the estimated coordinate transformations to the transformation information management unit 212 and the area control unit 214. As a method of estimating the coordinate transformation, for example, a Kalman filter, a particle filter, or a Bayesian filter is used.

The area control unit 214 acquires the coordinate transformations at the several future times estimated from the coordinate transformation estimation unit 213, and outputs control information to the area management unit 215 according to the coordinate transformations. For example, when the coordinate transformation is a rigid transformation matrix, the rigid transformation matrix is set as the control information. A scaling value at which an area is scaled up by 5% may also be set as the control information, and the internal processing speed may be monitored to adjust the scaling value according to the degree of the processing speed.

The area management unit 215 acquires the index information, the representative point position, and the cluster identification index of the moving grid from the connection relationship generation unit 207, and manages such information for a given period of time. Each of the cluster identification indices identified from the feature identification unit 210 is acquired and updated. On the other hand, separately from the information measured at the current time, that is, the information acquired from the connection relationship generation unit 207, information of each of the clusters (hereinafter, referred to as "estimated clusters") at the estimated several future times is managed. The estimated cluster is generated by controlling each of the clusters at the current time according to the control information acquired from the area control unit 214. Examples of the control process include a process of executing the coordinate transformation for each of the representative points to update the position, the posture, or the shape or a plurality of the information thereof, a process of isotropic expansion or contraction from the centroid of each of the representative points, and a process of rotation or deformation based on the centroid of each of the representative points. During the expansion or the contraction, the index of each of the clusters is added or deleted with reference to the indices of grids around the moving grid group. The index information and the representative point positions of the moving grids and the index of each of the groups in a period requested from the neighbor distance calculation unit 216 are output to the neighbor distance calculation unit 216.

The neighbor distance calculation unit 216 acquires the index information, the representative point position, and the cluster identification index of the moving grid at the current time from the area management unit 215, acquires the index information, the representative point position, and the cluster identification index of the moving grid of the estimated cluster, searches for neighbor points using the representative point position of each of the clusters, calculates each of the distances, and outputs the representative point positions of each of the clusters at the current time and each of the estimated clusters and the index information of each of the clusters associated with the calculated distances to the difference determination unit 217. The search for the neighbor points is rapidly executed by determining whether the representative point position of the estimated cluster is the same as or near one representative point position of the cluster at the current time. When the representative point position is not present, the distance for the index of the grid is set as infinite, and when the representative point position is present, the distance between the representative points is calculated. When the representative point position of the cluster at the current time is not present near one representative point position of the estimated cluster, the distance for the index of the grid is set as a negative value. At the first time, the estimated cluster is set to empty information, that is, the distances for all of the indices of the moving grids at the current time are set as infinite. The definition of setting the distances as infinite will be described below.

The difference determination unit 217 acquires the representative point positions of each of the clusters at the current time and each of the estimated clusters associated with the distance information and the index and the cluster identification index of the grid from the neighbor distance calculation unit 216. When each of the distances is more than or equal to a given threshold, the difference determination unit 217 determines that there is a difference, when each of the distances is less than the given threshold, the difference determination unit 217 determines that there is no difference, and when each of the distances is negative, the difference determination unit 217 determines that there is an inverse difference. The difference determination unit 217 associates the difference flag with the index of the grid of each of the clusters, and outputs the associated data and the cluster identification index to the masking unit 218. The definitions of the difference and the inverse difference will be described below.

The masking unit 218 acquires the representative point position of each of the clusters associated with the difference flags and the index and the cluster identification index of the grid from the difference determination unit 217, acquires the point cloud data corresponding to the index of the grid of each of the clusters flagged that there is a difference from the grid management unit 205, acquires coordinate transformation corresponding to each of the cluster identification indices from the transformation information management unit 212, and outputs the point cloud data and the coordinate transformation, the representative point position and the index information of the grid flagged that there is no difference, and the representative point position and the index of the grid flagged that there is an inverse difference to the three-dimensional information management unit 219.

The three-dimensional information management unit 219 acquires and manages, from the masking unit 218, the point cloud data and the coordinate transformation in each of the clusters, the representative point position and the index of the grid flagged that there is no difference, and the representative point position and the index of the grid flagged that there is an inverse difference. When the point cloud data at the current time is restored, the point cloud data portion remains as it is, inverse coordinate transformation is executed on the representative point position for the index of the grid flagged that there is no difference, the point cloud data in the index of the grid at the past time corresponding thereto is copied, and coordinate transformation is executed again. The copy operation is executed on indices other than the indices of the grids flagged that there is an inverse difference. Specific examples of the inverse coordinate transformation and the like will be described below.

Figure 3:
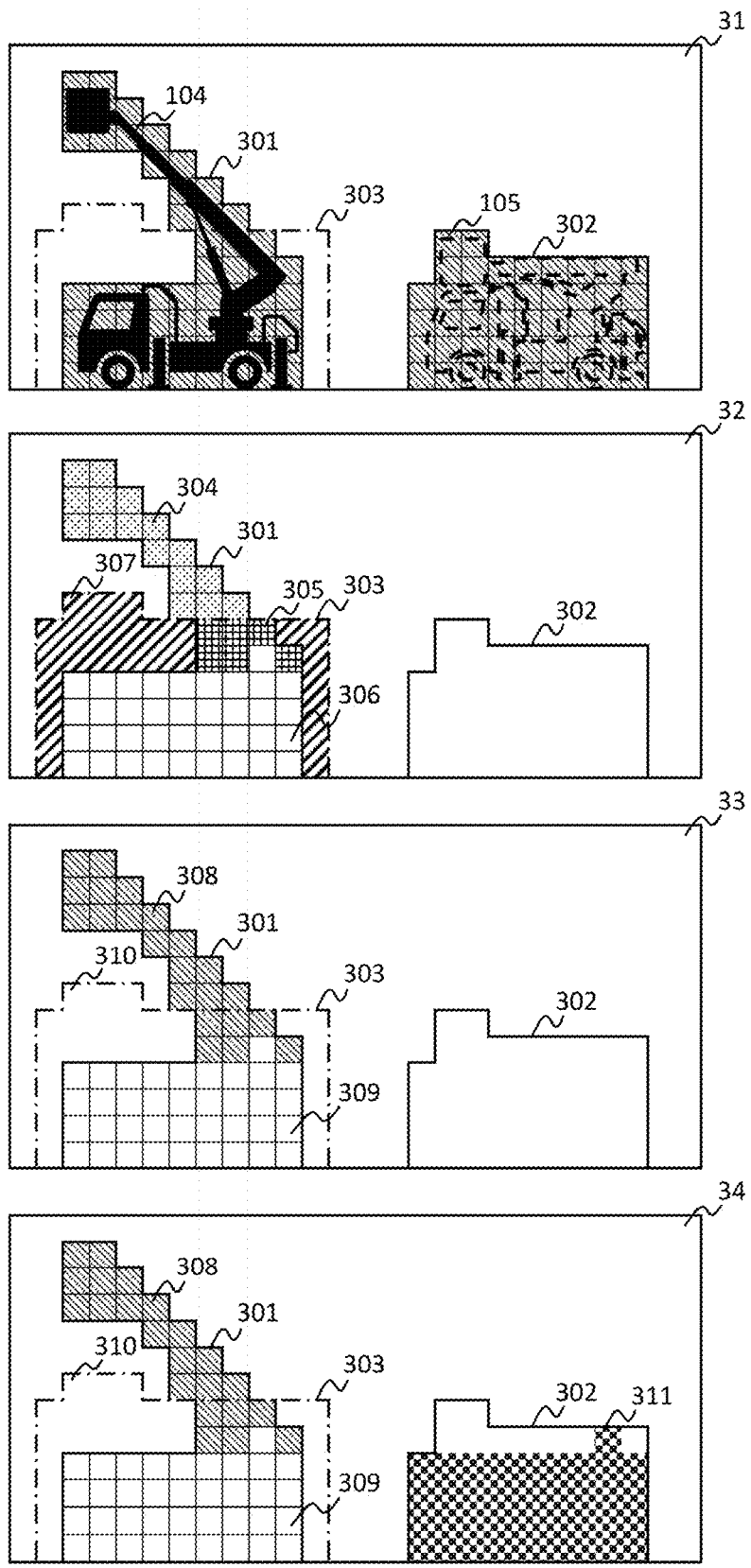
FIG. 3 is a diagram illustrating one example of a cluster that is managed by an area management unit and a specific example of processes that are executed by a neighbor distance calculation unit, a difference determination unit, and a three-dimensional information management unit.

FIG. 3 is a diagram illustrating one example of the cluster that is managed by the area management unit 215 and a specific example of processes that are executed by the neighbor distance calculation unit 216, the difference determination unit 217, and the three-dimensional information management unit 219. As the process proceeds from Process 31 to Process 34, the process progresses.

In Process 31, in a state where the subject 105 at the past time is moved up to the position of the subject 104 at the current time, a cluster 301 of the subject 104 at the current time and a cluster 302 of the subject 105 at the past time are managed by the area management unit 215. A cluster 303 is an estimated cluster at the past time and is generated by further expanding the area of the cluster 302. The estimated cluster is an area that is estimated at the past time to include the subject 104 at the current time. To reliably include the subject 104, it is desirable to expand the cluster 302 (a grid group where the subject 105 is present at the past time). Accordingly, the estimated cluster 303 is generated by expanding the cluster 302.

Process 32 is one example of a result of the process that is executed by the neighbor distance calculation unit 216 in Process 31, and a nearest neighbor distance between each of representative point positions of the estimated cluster 303 and each of representative point positions of the cluster 301 is calculated.

A neighbor distance 304 is an area where the representative point position of the estimated cluster 303 is not present at the same grid as the representative point position of the cluster 301, and thus is an area where the distance is set as infinite. The cluster 301 represents the current position and the current shape of the subject 104. The cluster corresponding to the neighbor distance 304 represents that the current position and the current shape of the subject 104 deviate from the estimated cluster 303 estimated at the past time. For example, the neighbor distance 304 is generated by deforming the subject. To represent the deviated shape, the neighbor distance 304 is set as infinite. As long as the same shape can be represented, the distance does not need to be set as infinite.

A neighbor distance 305 is an area where the representative point position of the estimated cluster 303 is present at the same grid as the representative point position of the cluster 301, and thus is an area where the distance between the two points is a value of a threshold or more. The cluster corresponding to the neighbor distance 305 represents that the current position and the current shape of the subject 104 are within the range of the estimated cluster 303 estimated at the past time, but the distance is more than a neighbor distance 306. For example, a portion where the deformation of the subject is within the estimated cluster 303 is the neighbor distance 305.

A neighbor distance 306 is an area where the representative point position of the estimated cluster 303 is present at the same grid as the representative point position of the cluster 301, and thus is an area where the distance between the two points is a value of less than the threshold. The cluster corresponding to the neighbor distance 306 is a portion where the subject is within the estimated cluster 303 and the shape thereof is not deformed (or the deformation is small).

A neighbor distance 307 is an area where the representative point position of the cluster 301 is not present at the same grid as the representative point position of the estimated cluster 303, and thus is an area where the distance between the two points is a negative value. The estimated cluster 303 is generated by expanding the cluster 302, and a portion where the subject 104 is not present is present in the estimated cluster 303. To represent the same portion, a neighbor distance 307 is set as a negative value. As long as the same portion can be represented, the distance does not need to be set as a negative value.

Process 33 is one example of a result of the process that is executed by the difference determination unit 217 in Process 32, and a difference is determined from the distances associated with the respective grids. A difference 308 is a grid that is determined that there is a difference because the neighbor distances 304 and 305 are the threshold or more. A difference 309 is a grid that is determined that there is no difference because the neighbor distance 306 is less than the threshold. A difference 310 is a grid that is determined that there is an inverse difference because the neighbor distance 307 is a negative value.

Process 34 is an example of the process that is executed by the three-dimensional information management unit 219, and point cloud data at each of times to be managed is restored. A moving grid group 311 is a grid corresponding to the past time when inverse coordinate transformation is executed on the representative point position of the difference 309. When the point cloud data belonging to the moving grid group 311 undergoes coordinate transformation again and is copied to a grid at the current time corresponding thereto, the original point cloud data is restored during integration with the difference 308.

The reason why the grid that is inverse-converted in Process 34 is coordinate-converted again will be described. When three-dimensional data at the current time is presented to a user instantaneously, three-dimensional data of the cluster 301 can be sufficiently used. On the other hand, when three-dimensional data at the current time is presented to a user afterwards, the three-dimensional data at the current time need to be temporarily stored and subsequently restored. By storing only the coordinate transformations for grids where there is no change (little change), the amount of data stored can be reduced. Note that, here, since the three-dimensional data stored is only the data (cluster 302) at the past time, inverse transformation is executed on the data at the past time to acquire the three-dimensional data at the past time and coordinate transformation is executed again. As a result, the portion where there is no change can be accurately restored while reducing the amount of data stored.

Figure 4:
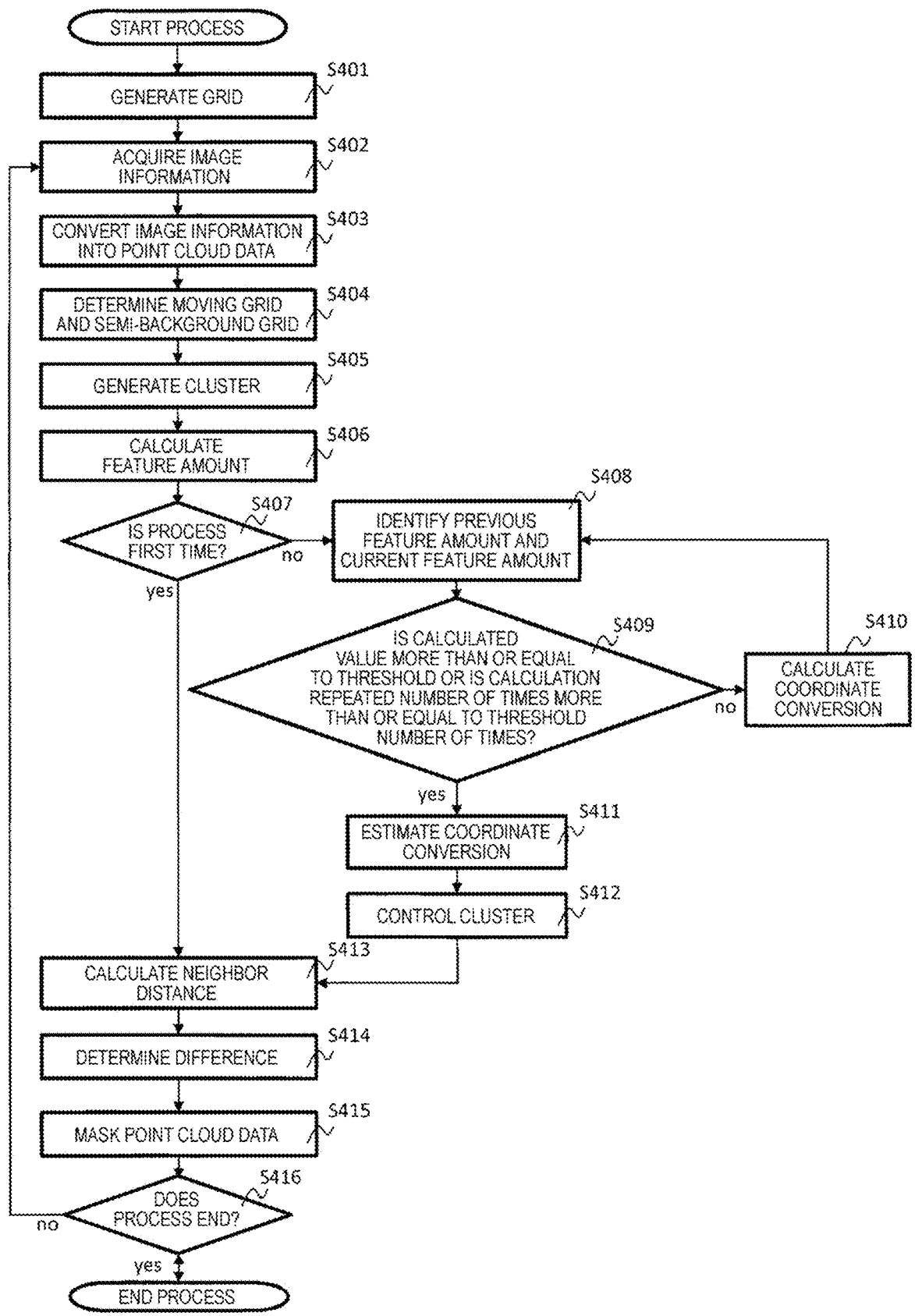
FIG. 4 is a diagram illustrating one example of a process flow that is executed by the three-dimensional data processing device.

FIG. 4 is a diagram illustrating one example of a process flow that is executed by the three-dimensional data processing device 1. In Step S401, the grid generation unit 204 generates grids based on the information of the coordinate system management unit 203. In Step S402, the image acquisition unit 201 acquires image information from the distance measuring device 102. In Step S403, the three-dimensional transformation unit 202 converts the image information into point cloud data. In Step S404, the motion determination unit 206 determines moving grids and semi-background grids. In Step S405, the connection relationship generation unit 207 groups the moving grids to generate a cluster. In Step S406, the feature calculation unit 208 calculates a feature of the moving grid. In Step S407, when the current process is the first time, Step S413 is executed, and when the current process is not the first time, Step S408 is executed. In Step S408, the feature identification unit 210 identifies a feature of each of the clusters at the past time and a feature of each of the clusters at the current time, and calculates the sum of the distances between the respective representative point positions. In Step S409, when the sum of the distances between the respective representative point positions calculated by the feature identification unit 210 is more than or equal to a threshold or when the number of repetitions of calculation of the feature identification unit 210 and the coordinate transformation calculation unit 211 is more than or equal to a threshold number of repetitions of calculation, Step S411 is executed. Otherwise, Step S410 is executed. In Step S410, the coordinate transformation calculation unit 211 calculates coordinate transformation between respective corresponding points identified by the feature identification unit 210. In Step S411, the coordinate transformation estimation unit 213 acquires information regarding a state space of each of the clusters, and estimates coordinate transformations at several future times. In Step S412, the area control unit 214 generates control information for each of the clusters managed by the area management unit 215 based on the information of the coordinate transformation estimated for each of the clusters, and the area management unit 215 generates estimated clusters based on the information. In Step S413, the neighbor distance calculation unit 216 calculates each of the distances between the clusters at the current time and the estimated clusters. In Step S414, the difference determination unit 217 determines a difference based on the information of each of the distances calculated by the neighbor distance calculation unit 216 and generates a difference flag. In Step S415, the masking unit 218 outputs the information regarding the point cloud data and the coordinate transformation, the index of the grid flagged that there is no difference, and the index of the grid flagged that there is an inverse difference to the three-dimensional information management unit 219 based on the difference flag. In Step S416, for example when a signal of process completion is input from an external apparatus, the process ends. Otherwise, the process returns to Step S402, and the process is executed.

In the first embodiment, the active compression process of estimating the information of the subject at several future times, controlling the clusters according to the content, and determining a difference from the same subject that is actually measured at the next time is described. However, only a passive compression process using only the information that is actually measured can also be executed. For example, the coordinate transformations at several future times are not estimated in the coordinate transformation estimation unit 213, the information regarding the coordinate transformation calculated by the coordinate transformation calculation unit 211 is acquired from the transformation information management unit 212, and is output to the area control unit 214 as it is as estimated information. Even in the area control unit 214, the acquired information regarding the coordinate transformation is output to the area management unit 215 as it is as control information. Accordingly, the estimated clusters managed by the area management unit 215 are the same as those generated by controlling the clusters at the past time based on the coordinate transformations calculated by the coordinate transformation calculation unit 211. As a result, the compression process using only the measured information can be executed.

First Embodiment: Summary

In the three-dimensional data processing device 1 according to the first embodiment, a change of each grid for each moving body is extracted as a difference, only the coordinate transformation is stored for a grid having a small change, and new three-dimensional data is acquired for a grid having a large change. As a result, the three-dimensional data can be efficiently compressed.

Second Embodiment

A second embodiment of the present invention is basically the same as the first embodiment, and only a difference will be mainly described. In general, the second embodiment is different from the first embodiment, in that the point cloud data is transmitted. When the point cloud data is stored in a local storage, the data compression and restoration process can be executed using one device with the configuration of the first embodiment. When the data is remotely restored, by using the configuration of the second embodiment, the three-dimensional data can be compressed during transmission and can be restored on the reception side.

Figure 5:
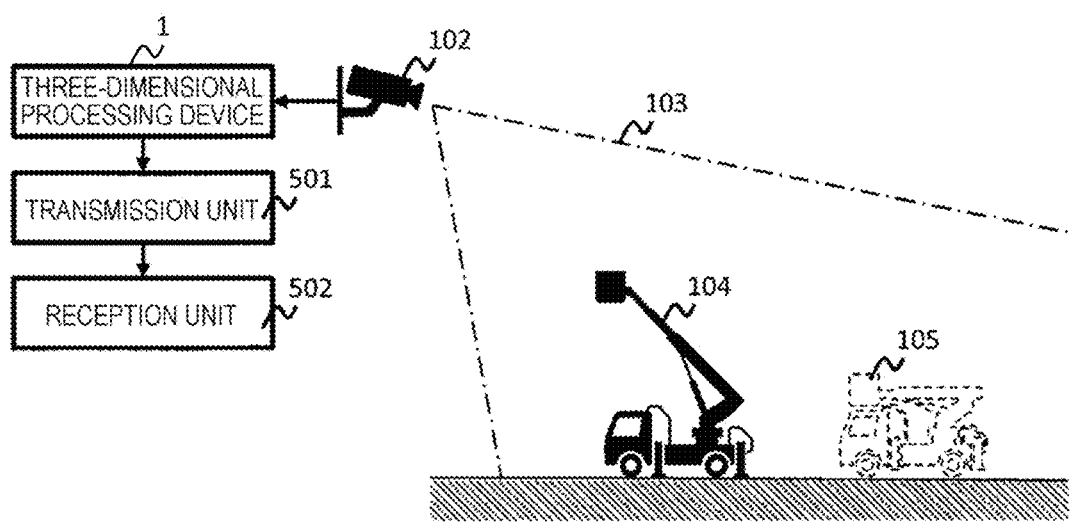
FIG. 5 is a diagram illustrating a configuration example of a three-dimensional data processing device according to a second embodiment.

FIG. 5 is a diagram illustrating a configuration example of the three-dimensional data processing device 1 according the second embodiment. In addition to the configuration described in the first embodiment, a transmission unit 501 and a reception unit 502 are newly provided. The transmission unit 501 transmits the information acquired from the three-dimensional data processing device 1 to the reception unit 502. The reception unit 502 receives the information transmitted from the transmission unit 501 and outputs the received information to the three-dimensional information management unit 219. The transmission unit 501 and the reception unit 502 may be configured as a part of the three-dimensional data processing device 1 or may be configured as separate devices.

Figure 6:
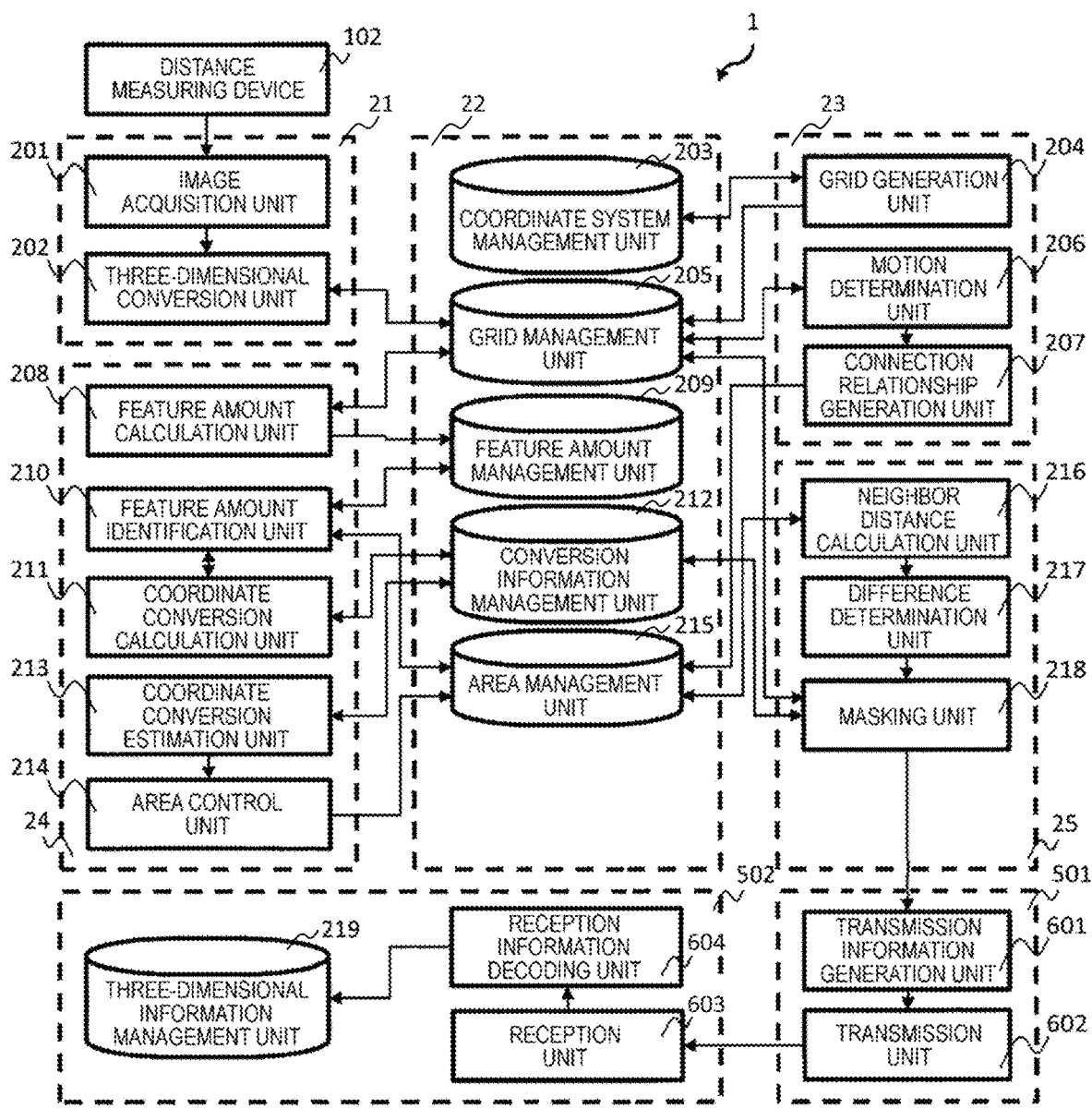
FIG. 6 is a functional block diagram illustrating the three-dimensional data processing device according to the second embodiment.

FIG. 6 is a functional block diagram illustrating the three-dimensional data processing device 1 according to the second embodiment. The transmission unit 501 includes a transmission information generation unit 601 and a transmission unit 602. The reception unit 502 includes a reception unit 603 and a reception information decoding unit 604. The three-dimensional information management unit 219 is transitioned from the information management unit 22 to the reception unit 502.

The masking unit 218 outputs the information regarding the point cloud data and the coordinate transformation, the representative point position and the index information of the grid flagged that there is no difference, and the representative point position and the index of the grid flagged that there is an inverse difference to the transmission information generation unit 601 instead of the three-dimensional information management unit 219.

The transmission information generation unit 601 acquires the information regarding the point cloud data and the coordinate transformation in each of the clusters, the representative point position and the index information of the grid flagged that there is no difference, and the representative point position and the index of the grid flagged that there is an inverse difference from the masking unit 218, shapes the data during the transmission, and outputs the shaped data to the transmission unit 602. The data shaping is executed, for example, by serializing various data according to a predetermined format, executing lossless compression such as ZIP algorithm, and adding the compressed data to the end of the header information.

The transmission unit 602 transmits the data acquired from the transmission information generation unit 601 to the reception unit 603. As the transmission protocol, for example, UDP, TCP, or Web Socket is used. When a transmission destination is not present, error is output according to a setting such as time-out, or reconnection is constantly tried.

The reception unit 603 receives the data from the transmission unit 602. The reception information decoding unit 604 converts the data acquired from the reception unit 603 into the original data array, and outputs the information regarding the point cloud data and the coordinate transformation in each of the clusters, the representative point position and the index of the grid flagged that there is no difference, and the representative point position and the index of the grid flagged that there is an inverse difference to the three-dimensional information management unit 219. The transformation into the original data array is executed, for example, by serializing the data in the transmission information generation unit 601 according to the header information and deserializing and decoding the ZIP-compressed data.

Figure 7A:
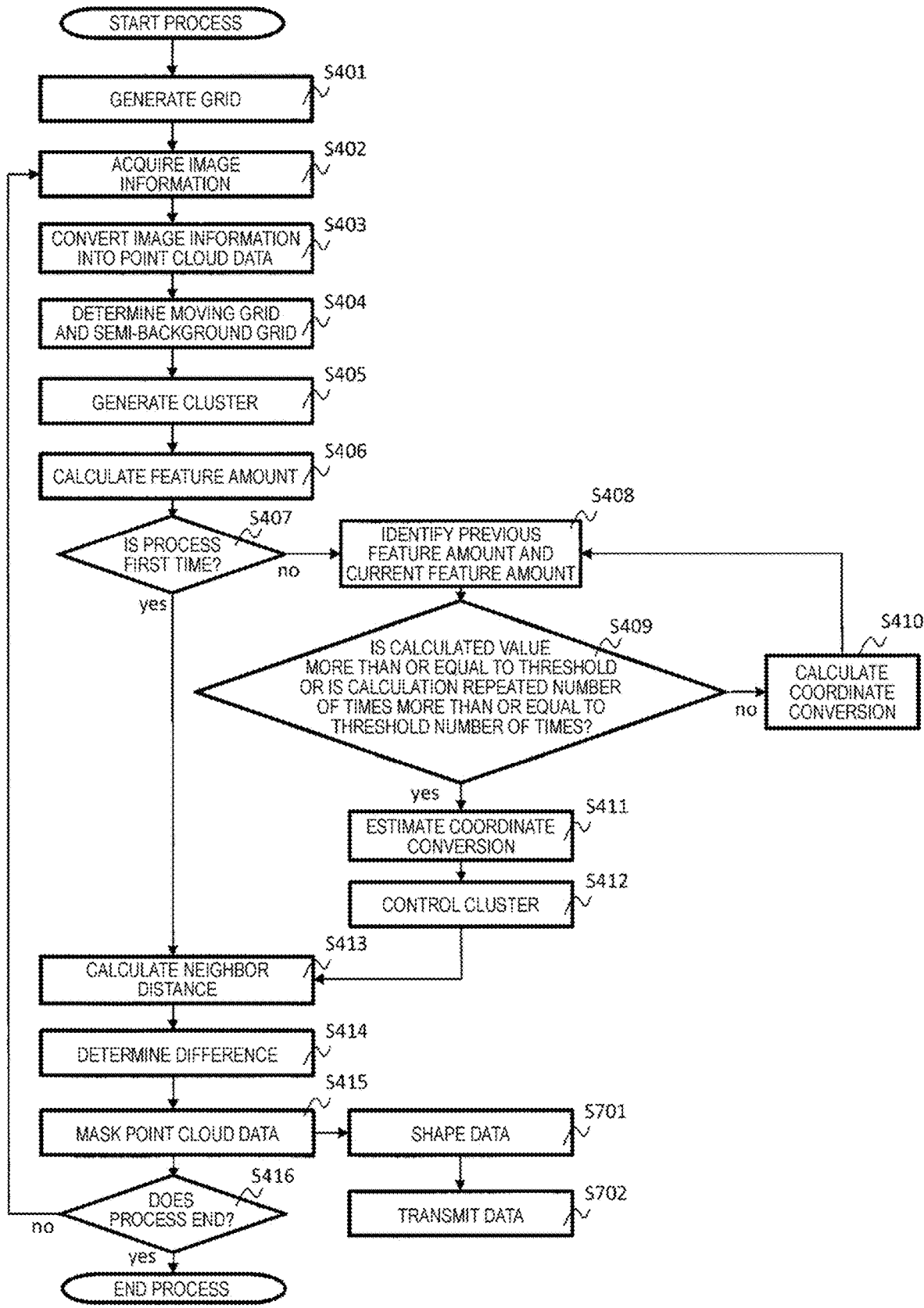
FIG. 7A is a diagram illustrating one example of a process flow that is executed by the three-dimensional data processing device according to the second embodiment.
Figure 7B:
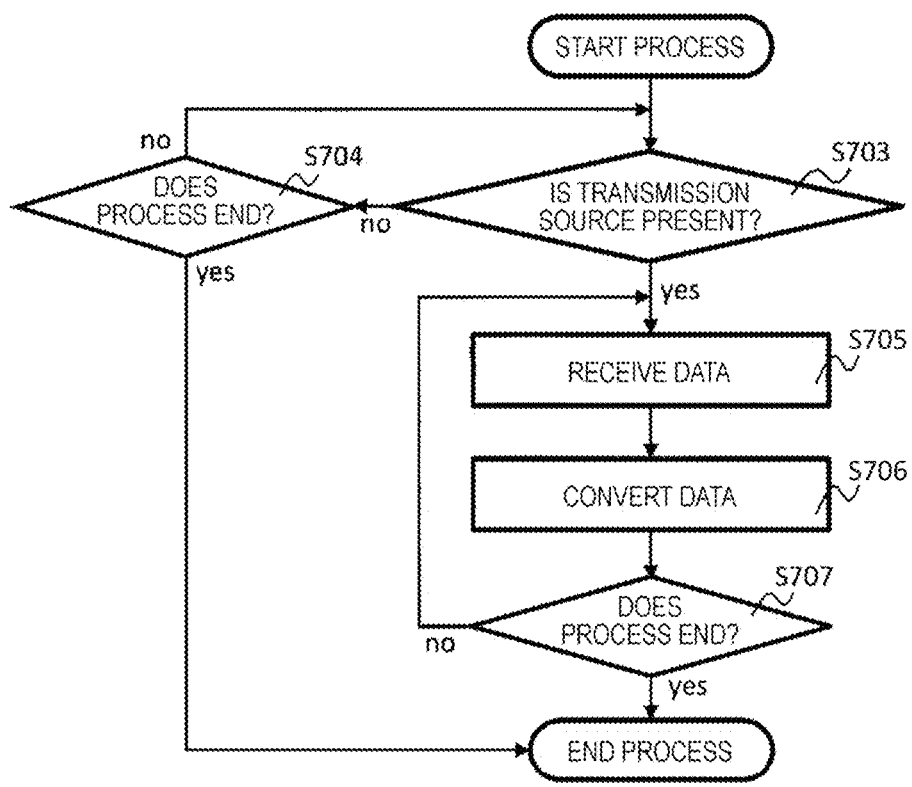
FIG. 7B is a diagram illustrating one example of a process flow that is executed by the three-dimensional data processing device according to the second embodiment.

FIGS. 7A and 7B illustrate one example of a process flow that is executed by the three-dimensional data processing device 1 according to the second embodiment. In addition to the flowchart illustrated in FIG. 4, Steps S701 to S707 are newly provided. S701 and S702 are executed on the transmission side. S703 to S707 are executed on the reception side.

In Step S701, the transmission information generation unit 601 executes data shaping for the information regarding the point cloud data and the coordinate transformation in each of the clusters, the representative point position and the index of the grid flagged that there is no difference, and the representative point position and the index of the grid flagged that there is an inverse difference acquired from the masking unit 218. In Step S702, the transmission unit 602 transmits the data acquired from the transmission information generation unit 601.

In Step S703, when a transmission source is present, Step S704 is executed, and when a transmission source is not present, the process proceeds to Step S704. In Step S704, for example when a signal of process completion is input from an external apparatus, the process ends. Otherwise, the process returns to Step S703, and the process is executed. In Step S705, the reception unit 603 receives the data from the transmission unit 602. In Step S706, the reception information decoding unit 604 converts the data acquired from the reception unit 603 into the original data array. In Step S707, for example when a signal of process completion is input from an external apparatus, the process ends. Otherwise, the process returns to Step S705, and the process is executed.

Second Embodiment: Summary

In the three-dimensional data processing device 1 according to the second embodiment, the three-dimensional data is efficiently compressed as in the first embodiment, and the compressed three-dimensional data can be transmitted to the reception unit 502 (for example, a reception device that is configured separately from the three-dimensional data processing device 1). In the reception unit 502, the compressed three-dimensional data can be restored as in the first embodiment. That is, the three-dimensional data can be efficiently transmitted to a remote site.

Third Embodiment

A third embodiment of the present invention is basically the same as the first embodiment, and only a difference will be mainly described. In general, the third embodiment is different from the first embodiment, in that the point cloud data is reproduced in a virtual space and a moving body in an area that a user is seeing attracts attention. For example, in a state where a plurality of moving bodies are present, when a moving body that is unnecessary during actual use is present, by using the configuration of the third embodiment, a moving body can be selected, and data can be further compressed.

Figure 8:
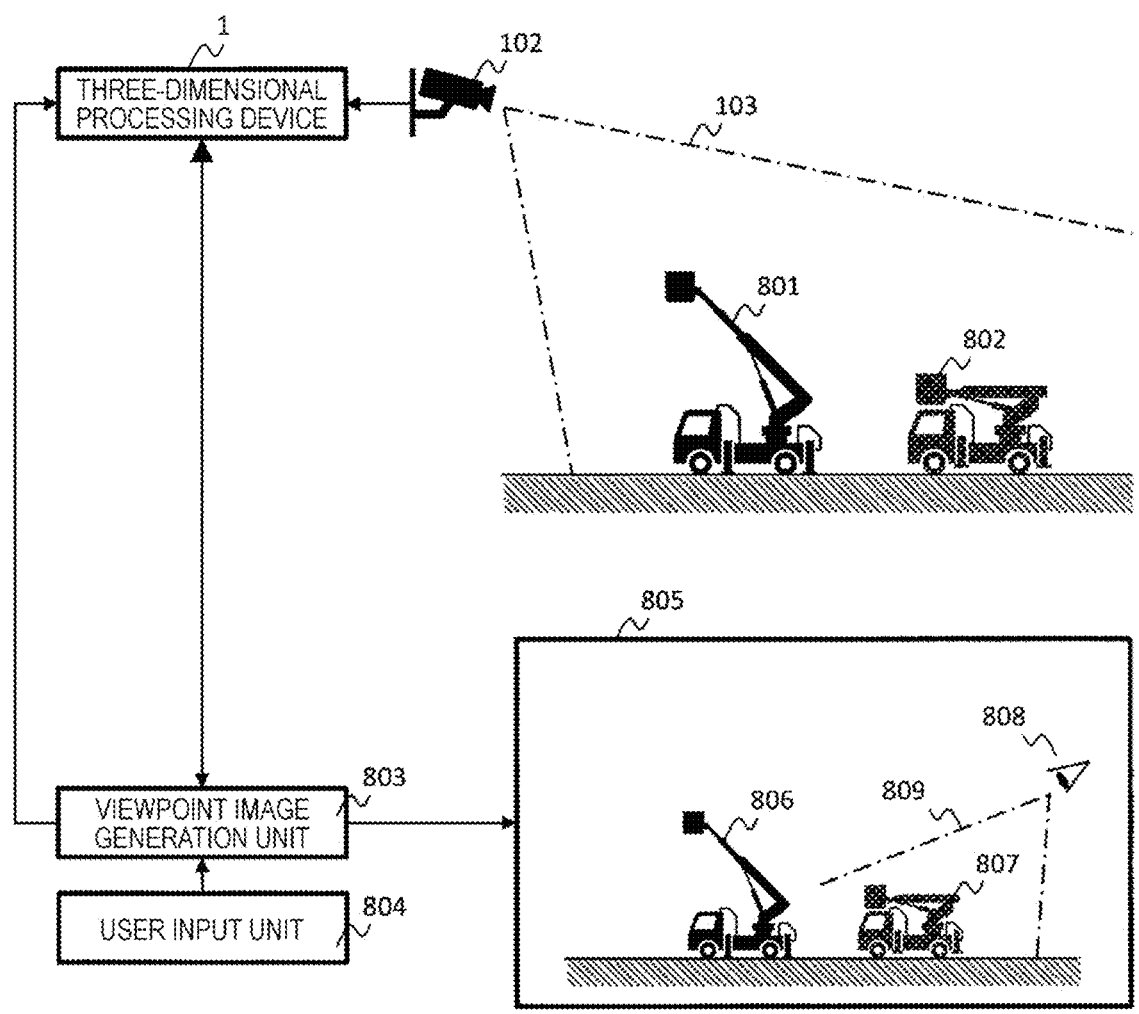
FIG. 8 is a diagram illustrating a configuration example of a three-dimensional data processing device according to a third embodiment.

FIG. 8 is a diagram illustrating a configuration example of the three-dimensional data processing device 1 according the third embodiment. As compared to the configuration of the first embodiment, a viewpoint image generation unit 803 and a user input unit 804 are newly provided. Moving subjects 801 and 802 are imaged by the distance measuring device 102, point cloud data is output from the three-dimensional data processing device 1 to the viewpoint image generation unit 803, and an image of a user's viewpoint is generated for the point cloud data in a virtual space 805 in response to an input from the user input unit 804 (field-of-view specifying unit). Subject data 806 and 807 are point cloud data of the subjects 801 and 802 reproduced in the virtual space 805. A virtual viewpoint 808 is a user's viewpoint in the virtual space 805. A field of view 809 is a field of view in the virtual viewpoint 808. The viewpoint image generation unit 803 and the user input unit 804 may be configured as a part of the three-dimensional data processing device 1 or may be configured as separate devices.

Figure 9:
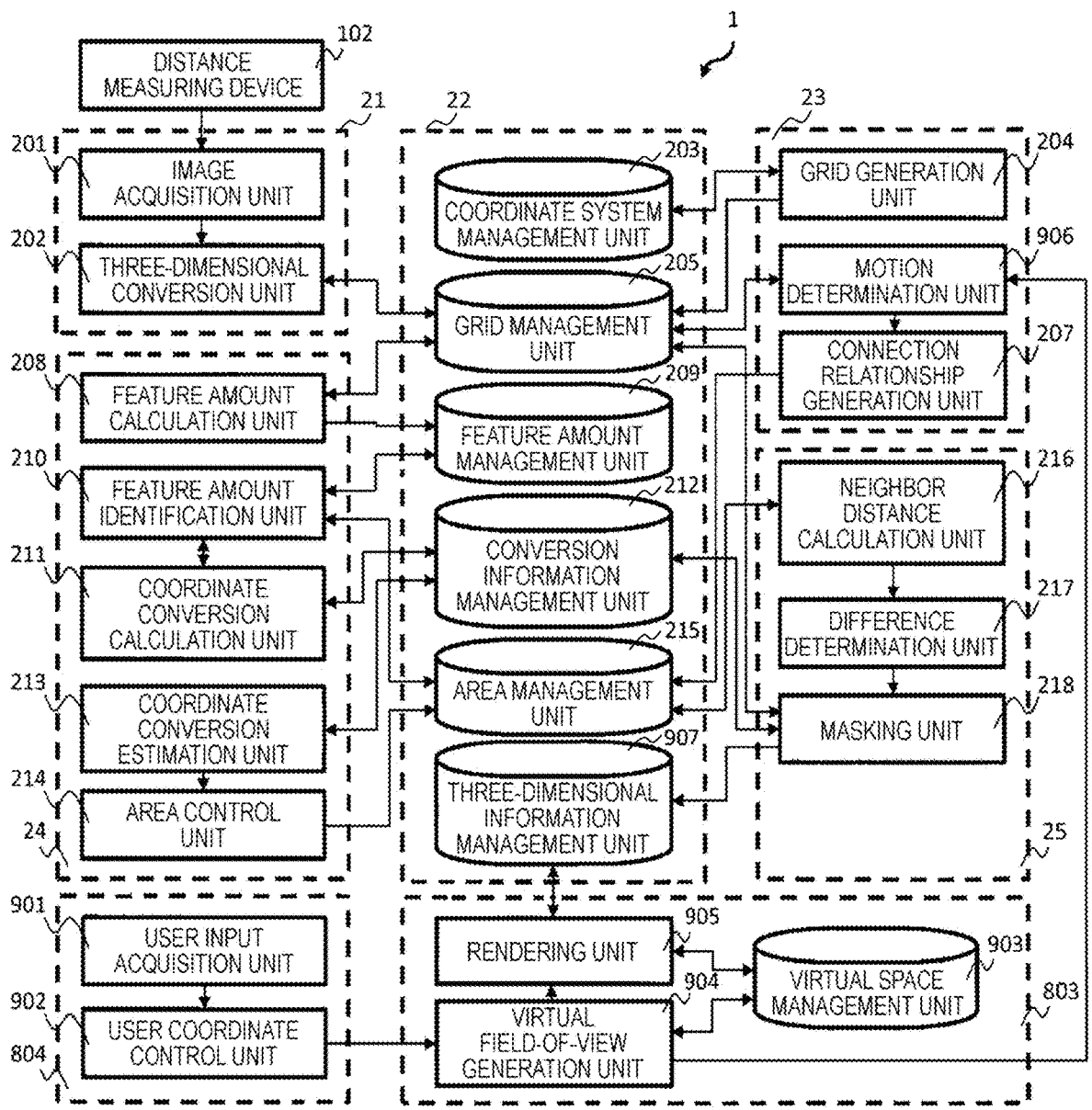
FIG. 9 is a functional block diagram illustrating the three-dimensional data processing device according to the third embodiment.

FIG. 9 is a functional block diagram illustrating the three-dimensional data processing device 1 according to the third embodiment. The user input unit 804 includes a user input acquisition unit 901 and a user coordinate control unit 902. The viewpoint image generation unit 803 includes a virtual space management unit 903, a virtual field-of-view generation unit 904, and a rendering unit 905. The motion determination unit 206 and the three-dimensional information management unit 219 are changed to a motion determination unit 906 and a three-dimensional information management unit 907. The motion determination unit 906 and the three-dimensional information management unit 907 are basically the same as the motion determination unit 206 and the three-dimensional information management unit 219. Therefore, only a difference will be described below.

The user input acquisition unit 901 acquires an input signal from a user's device or the like and outputs the input signal to the user coordinate control unit 902. Examples of the input operation include an operation of pressing a keyboard, an operation of moving or dragging a mouse, and an operation of moving or tilting the head portion of a head mounted display (HMD).

The user coordinate control unit 902 acquires the input signal from the user input acquisition unit 901, converts the input signal into a movement amount and a rotational movement amount of the virtual viewpoint 808, and outputs the movement amount and the rotational movement amount to the virtual field-of-view generation unit 904.

The virtual space management unit 903 manages spatial information required to generate an image in the virtual viewpoint 808, position and posture information of the user's viewpoint 808, and a parameter of a camera model, outputs the spatial information, the position and posture information of the user's viewpoint 808, and the parameter of the camera model in response to a request from the virtual field-of-view generation unit 904, and outputs the spatial information in response to a request from the rendering unit 905. The position and posture information of the user's viewpoint 808 is input from the virtual field-of-view generation unit 904, the information is updated. The spatial information to be managed is, for example, an origin position of a world coordinate system, whether the coordinate system is a right-handed system or a left-handed system, the definition of a vertical axis with respect to the ground, for example, Z-up or Y-up, or definition of vertex information or the like of a bounding box representing a spatial range, and is basically the same as the information managed by the coordinate system management unit 203.

The virtual field-of-view generation unit 904 requests and acquires the spatial information, the position and posture information of the user's viewpoint 808, and the parameter of the camera model managed by the virtual space management unit 903, updates the position and posture information of the user's viewpoint 808 using the movement amount and the rotational movement amount of the virtual viewpoint 808 acquired from the user coordinate control unit 902, and outputs the updated information to the virtual space management unit 903. Projective transformation is calculated using the position and posture information of the user's viewpoint 808 and the parameter of the camera model and is output to the rendering unit 905. Frustum information representing the field of view is calculated using the position and posture information of the user's viewpoint 808 and the parameter of the camera model and is output to the motion determination unit 206. An initial value of the position and posture information of the user's viewpoint 808 is, for example, the origin of the space.

The rendering unit 905 requests and acquires the spatial information managed by the virtual space management unit 903, requests and acquires the point cloud data managed by the three-dimensional information management unit 907, executes rending using the projective transformation acquired from the virtual field-of-view generation unit 904, and displays the rendered image to a user.

In addition to the process of the motion determination unit 206, the motion determination unit 906 determines moving grids that are not present in the range of the frustum as semi-background grids using the frustum information acquired from the virtual field-of-view generation unit 904.

In addition to the process of the three-dimensional information management unit 219, the three-dimensional information management unit 907 restores the point cloud data in response to a request from the rendering unit 905 and outputs the restored data to the rendering unit 905.

Figure 10A:
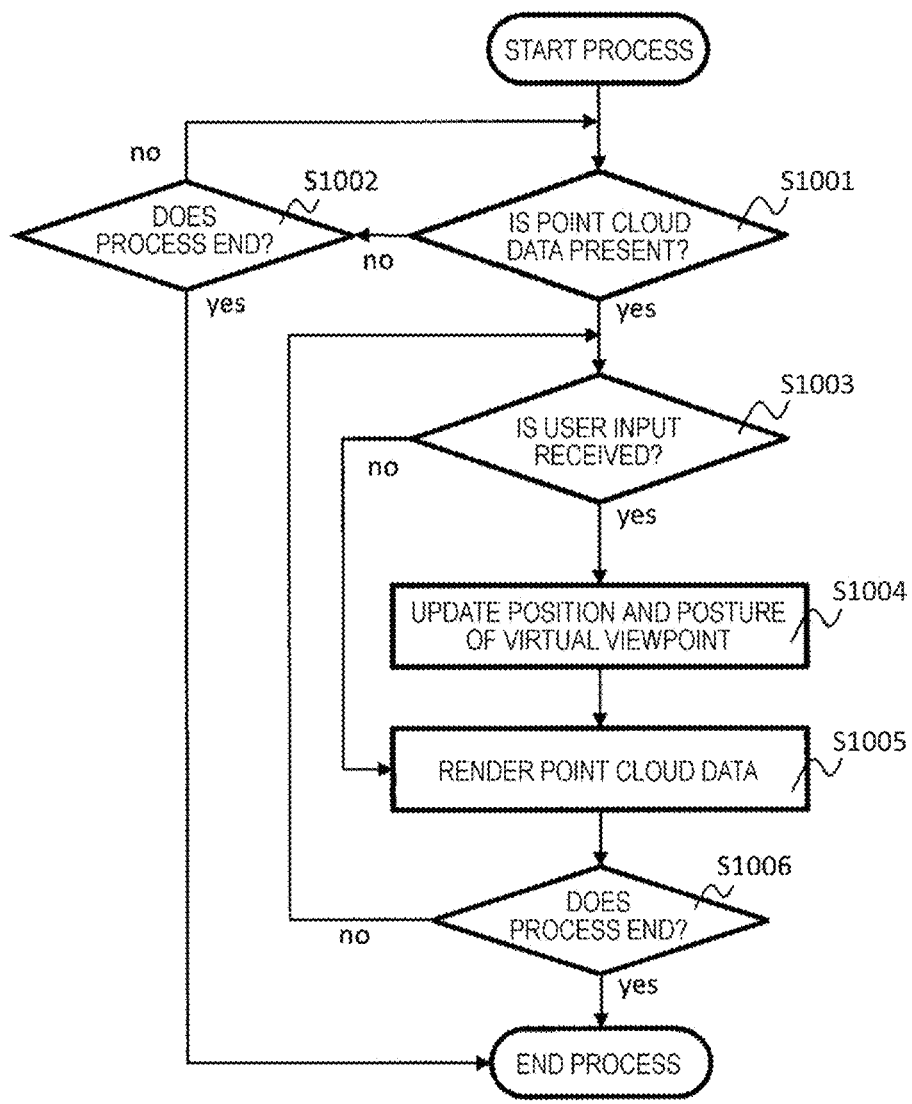
FIG. 10A is a diagram illustrating one example of a process flow that is executed by the three-dimensional data processing device according to the third embodiment.
Figure 10B:
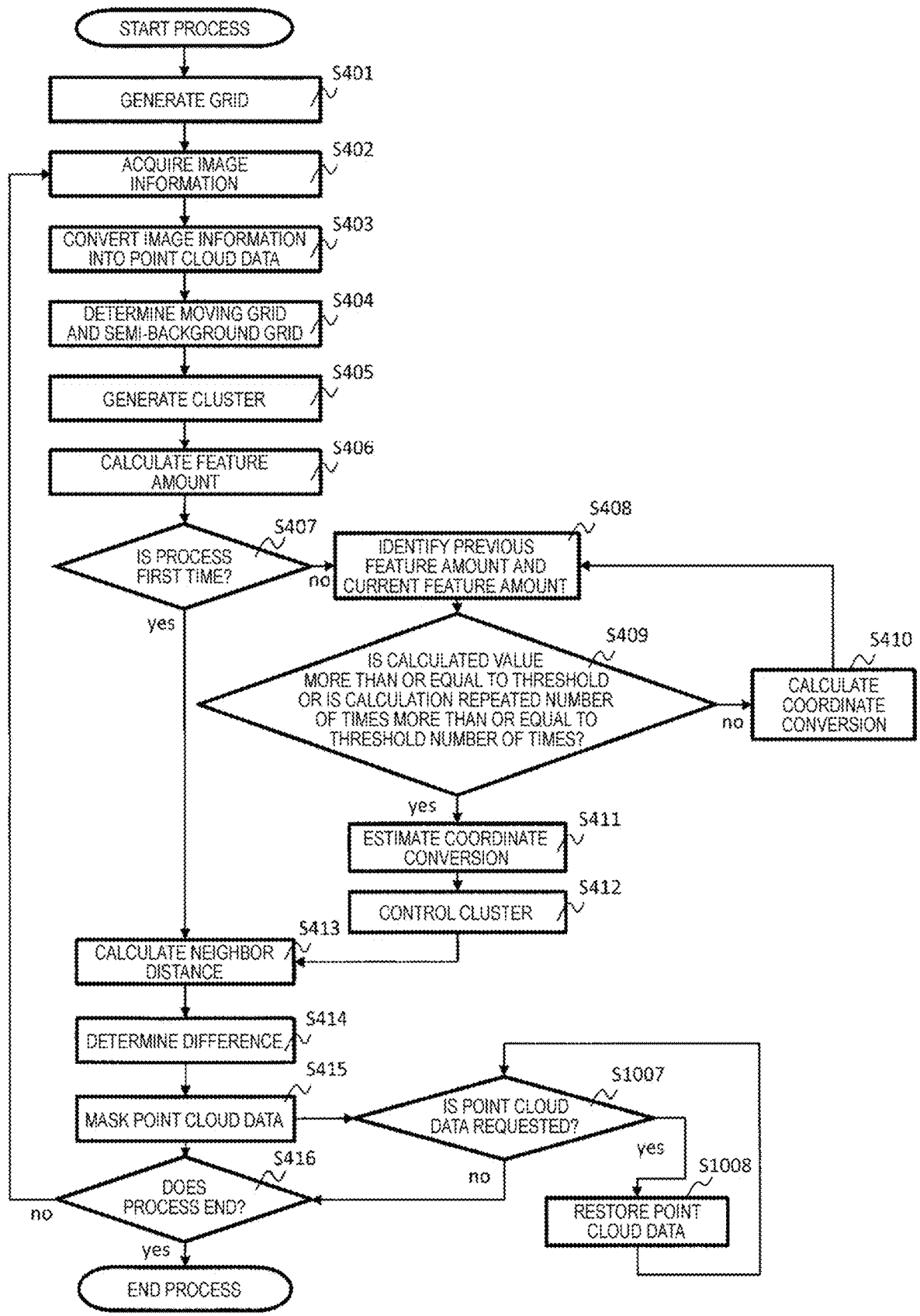
FIG. 10B is a diagram illustrating one example of a process flow that is executed by the three-dimensional data processing device according to the third embodiment.

FIGS. 10A and 10B illustrate one example of a process flow that is executed by the three-dimensional data processing device 1 according to the third embodiment. In addition to the flowchart illustrated in FIG. 4, Steps S1001 to S1008 are newly provided. S1001 to S1006 are the processes by the viewpoint image generation unit 803 and the user input unit 804.

In Step S1001, the rendering unit 905 requests the point cloud data from the three-dimensional information management unit 907. When the point cloud data is not present, the process of Step S1002 is executed, and when the point cloud data is present, the process of Step S1003 is executed. In Step S1002, for example when a signal of process completion is input from an external apparatus, the process ends. Otherwise, the process returns to Step S1001, and the process is executed. In Step S1003, when the user input signal is not present, the user input acquisition unit 901 executes the process of Step S1005, and when the user input signal is present, the user input acquisition unit 901 executes the process of Step S1004. In Step S1004, the virtual field-of-view generation unit 904 updates the position and posture information of the user's viewpoint 808 and calculates the projective transformation and the frustum information. In Step S1005, the rendering unit 905 renders the point cloud data. In Step S1006, for example when a signal of process completion is input from an external apparatus, the process ends. Otherwise, the process returns to Step S1003, and the process is executed.

In Step S1007, when a request is transmitted from the rendering unit 905 to the three-dimensional information management unit 907, the process of Step S1008 is executed. In Step S1008, the three-dimensional information management unit 907 restores the point cloud data in response to the request from the rendering unit 905.

Third Embodiment: Summary

In the three-dimensional data processing device 1 according to the third embodiment, in addition to the first embodiment, a moving body to be processed can be selected based on the user's field of view, and data can be further compressed.

<Regarding Modification Example of Present Invention>

The present invention is not limited to the embodiments and includes various modification examples. For example, the embodiments have been described in detail in order to easily describe the present invention, and the present invention is not necessarily to include all the configurations described above. A part of the configuration of one embodiment can be replaced with the configuration of another embodiment. The configuration of one embodiment can be added to the configuration of another embodiment. Addition, deletion, and replacement of another configuration can be made for a part of the configuration of each of the embodiments.

In the above-described embodiments, each of the functional units in the three-dimensional data processing device 1 can also be configured by hardware such as a circuit device that implements the function or can also be configured by an arithmetic device such as a central processing unit (CPU) executing software that implements the function.

What is claimed is:

1. A three-dimensional data processing device that processes three-dimensional data describing a subject present in a three-dimensional space, the device comprising:
   a data acquisition unit configured to acquire the three-dimensional data;
   an area calculation unit configured to detect an area where the subject is present in the three-dimensional data;
   a transformation calculation unit configured to calculate coordinate transformation of the subject between different times; and
   a difference calculation unit configured to calculate a difference of the three-dimensional data between different times, wherein
   the area calculation unit detects the subject in the three-dimensional data at a first time as a first area,
   the area calculation unit detects the subject in the three-dimensional data at a second time as a second area,
   the transformation calculation unit calculates the coordinate transformation between the first area and the second area,
   the difference calculation unit calculates the difference between the first time and the second time by comparing corresponding portions of the first area and the second area to each other using the coordinate transformation,
   the transformation calculation unit estimates an estimated area that is estimated to include the subject at the second time from the first area based on the coordinate transformation and estimates the three-dimensional data in the estimated area,
   the difference calculation unit calculates the difference by comparing the three-dimensional data in the estimated area and the three-dimensional data in the second area to each other,
   the area calculation unit generates a plurality of grids by dividing the three-dimensional space into a grid shape comprising a plurality of regular parallelepiped grids,
   the difference calculation unit calculates a distance between the three-dimensional data in the second area and the three-dimensional data in the estimated area for each of the grids,
   the difference calculation unit calculates, as the difference, the three-dimensional data in the grid of the second area that is included in the estimated area and where the distance is equal to or more than a threshold,
   the difference calculation unit specifies, as a non-difference grid, the grid of the second area that is included in the estimated area and where the distance is less than the threshold, and
   the difference calculation unit calculates, as an inverse difference, the three-dimensional data in the grid of the second area that is included in the estimated area and where the distance is a negative value.

2. The three-dimensional data processing device according to claim 1, wherein
   the transformation calculation unit calculates the coordinate transformation by specifying at least one of a movement amount, rotation, or deformation of the subject between the first area and the second area, and
   the transformation calculation unit calculates the coordinate transformation by identifying corresponding portions of the first area and the second area.

3. The three-dimensional data processing device according to claim 1, wherein
   the difference calculation unit calculates, as the difference, the three-dimensional data in a portion of the second area that is not included in the estimated area.

4. The three-dimensional data processing device according to claim 1, wherein
   the difference calculation unit excludes the three-dimensional data in the non-difference grid from the difference.

5. The three-dimensional data processing device according to claim 4, wherein
   the difference calculation unit specifies, as the non-difference grid, a portion that is included in the estimated area and does not include in the second area.

6. The three-dimensional data processing device according to claim 4, further comprising a data management unit configured to manage the three-dimensional data, wherein
   the data management unit reduces a data volume to be managed by managing data describing a content of the coordinate transformation instead of the three-dimensional data itself in a portion of the three-dimensional data corresponding to the non-difference grid.

7. The three-dimensional data processing device according to claim 4, further comprising a data management unit configured to manage the three-dimensional data, wherein
   the data management unit specifies the grid corresponding to the non-difference grid in the first area by applying inverse transformation of the coordinate transformation to the three-dimensional data in the non-difference grid,
   the data management unit restores the three-dimensional data belonging to the non-difference grid in the second area by applying the coordinate transformation to the three-dimensional data belonging to the grid specified by the inverse transformation, and
   the data management unit reduces a data volume to be managed by executing the restoration instead of managing the three-dimensional data itself in the non-difference grid.

8. The three-dimensional data processing device according to claim 1, further comprising a transmission unit configured to transmit the three-dimensional data, wherein
   the transmission unit reduces a data volume to be transmitted by transmitting data describing a content of the coordinate transformation instead of the three-dimensional data itself in a portion of the three-dimensional data corresponding to the non-difference grid.

9. The three-dimensional data processing device according to claim 4, further comprising a transmission unit configured to transmit the three-dimensional data, wherein
the transmission unit reduces a data volume to be transmitted by transmitting information for specifying the non-difference grid instead of the three-dimensional data itself in the non-difference grid.

10. The three-dimensional data processing device according to claim 1, further comprising:
a virtual space management unit configured to draw the three-dimensional data in a virtual space; and
a field-of-view specifying unit configured to specify a field of view of a user who sees the drawn three-dimensional data, wherein
the area calculation unit, the transformation calculation unit, and the difference calculation unit use only a portion of the three-dimensional data that is included in the field of view as a target to be processed.

11. The three-dimensional data processing device according to claim 10, wherein
the field-of-view specifying unit receives a user input for designating a virtual field of view of the user in the virtual space, and
the field-of-view specifying unit specifies, as the field of view, the virtual field of view designated by the user input.

12. A three-dimensional data processing method of processing three-dimensional data describing a subject present in a three-dimensional space, the method comprising:
a step of acquiring the three-dimensional data;
a step of detecting an area where the subject is present in the three-dimensional data;
a step of calculating coordinate transformation of the subject between different times; and
a step of calculating a difference of the three-dimensional data between different times, wherein
in the step of detecting the area, the subject in the three-dimensional data at a first time is detected as a first area,
in the step of detecting the area, the subject in the three-dimensional data at a second time is detected as a second area,
in the step of calculating the coordinate transformation, the coordinate transformation between the first area and the second area is calculated,
in the step of calculating the difference, the difference between the first time and the second time is calculated by comparing corresponding portions of the first area and the second area to each other using the coordinate transformation, and
the step of calculating the difference further comprises
generating a plurality of grids by dividing the three-dimensional space into a grid shape comprising a plurality of regular parallelepiped grids;
calculating a distance between the three-dimensional data in the second area and the three-dimensional data in the estimated area for each of the grids;
calculating, as the difference, the three-dimensional data in the grid of the second area that is included in the estimated area and where the distance is equal to or more than a threshold;
specifying, as a non-difference grid, the grid of the second area that is included in the estimated area and where the distance is less than the threshold, and
calculating, as an inverse difference, the three-dimensional data in the grid of the second area that is included in the estimated area and where the distance is a negative value.

* * * * *